(12) United States Patent
Sautier et al.

(10) Patent No.: US 7,452,492 B2
(45) Date of Patent: Nov. 18, 2008

(54) METHOD OF FABRICATING A MAGNETIC CODER DEVICE, AND THE DEVICE OBTAINED THEREBY

(75) Inventors: Pascal Sautier, Montargis (FR); Gilles Argy, La Queue les Yvelines (FR)

(73) Assignee: Hutchinson (FR)

( * ) Notice: Subject to any disclaimer, the term of this patent is extended or adjusted under 35 U.S.C. 154(b) by 504 days.

(21) Appl. No.: 10/863,476

(22) Filed: Jun. 8, 2004

(65) Prior Publication Data

US 2004/0251652 A1    Dec. 16, 2004

(30) Foreign Application Priority Data

Jun. 10, 2003    (FR)    .................. 03 06915

(51) Int. Cl.
C04B 35/00    (2006.01)
B29C 47/00    (2006.01)
H05B 6/00    (2006.01)

(52) U.S. Cl. .................. 264/104; 264/108; 264/427; 264/429; 264/435; 264/436; 264/437; 264/478; 425/3

(58) Field of Classification Search .................. 264/427, 264/429, 402, 108, 237; 148/100–101, 105; 425/78; 324/174
See application file for complete search history.

(56) References Cited

U.S. PATENT DOCUMENTS

| | | | | | |
|---|---|---|---|---|---|
| 2,999,275 | A | * | 9/1961 | Blume, Jr. .................. | 156/243 |
| 3,021,230 | A | * | 2/1962 | Deriaud .................. | 427/549 |
| 3,066,355 | A | * | 12/1962 | Schloemann et al. .................. | 264/430 |
| 3,787,747 | A | * | 1/1974 | Scott .................. | 315/3.5 |
| 4,186,609 | A | * | 2/1980 | Baermann .................. | 73/497 |
| 4,562,019 | A | * | 12/1985 | Inoue .................. | 264/429 |
| 4,778,635 | A | * | 10/1988 | Hechtman et al. .................. | 264/437 |
| 5,079,534 | A | * | 1/1992 | Steingroever et al. .................. | 335/284 |
| 5,089,817 | A | * | 2/1992 | Santos et al. .................. | 341/15 |
| 5,145,614 | A | | 9/1992 | Kuroda | |
| 5,476,272 | A | * | 12/1995 | Hixson, II .................. | 277/317 |
| 6,063,322 | A | * | 5/2000 | Draxler et al. .................. | 264/428 |
| 6,106,759 | A | * | 8/2000 | Jarrard .................. | 264/429 |
| 6,123,892 | A | * | 9/2000 | Jarrard .................. | 264/429 |
| 6,602,571 | B2 | * | 8/2003 | Yamaguchi .................. | 428/66.6 |
| 6,663,799 | B2 | * | 12/2003 | Kokubo et al. .................. | 252/512 |
| 7,019,515 | B2 | * | 3/2006 | Sentoku .................. | 324/207.25 |

FOREIGN PATENT DOCUMENTS

| | | |
|---|---|---|
| EP | 1 184 668 A | 3/2002 |
| EP | 1 291 660 A | 3/2003 |
| WO | WO 02/103296 A | 12/2002 |

* cited by examiner

*Primary Examiner*—Monica A Huson
*Assistant Examiner*—Jeff Wollschlager
(74) *Attorney, Agent, or Firm*—Alston & Bird LLP

(57) ABSTRACT

A method of fabricating a magnetic coder device, the method being of the type consisting in making a mixture of ferromagnetic particles or ferrites in a matrix, in molding the matrix, and in subjecting the molded matrix to a magnetic field so as to obtain a continuous alternation of north and south magnetic poles, which method consists in using a matrix having viscosity that is sufficiently low to enable the ferrites to migrate, in applying a magnetic field during the molding operation while maintaining the matrix at a given temperature in order to reduce its viscosity and thereby making it easier to cause the ferromagnetic particles to migrate and become oriented in their direction of easy magnetization, and to obtain discontinuous shapes having high particle concentration, and in suddenly cooling the matrix while the magnetic field is maintained so as to freeze the particles in the matrix.

9 Claims, 2 Drawing Sheets

METHOD OF FABRICATING A MAGNETIC CODER DEVICE, AND THE DEVICE OBTAINED THEREBY

The invention relates to a method of fabricating a magnetic coder device, and in particular an angle coder gasket suitable for use in particular in applications for measuring angular speeds in the automobile industry, for example.

BACKGROUND OF THE INVENTION

In an angle coder gasket that is already known, ferromagnetic fillers or ferrites are uniformly dispersed in an elastomer matrix which is molded on a receiving support of annular shape, for example. During the operation of being mixed with the elastomer matrix, the ferrites are mechanically oriented into their easy magnetization direction, without being able to migrate within the matrix. Mechanical orientation is obtained, for example, by subjecting the matrix to shear operations. Thereafter, the matrix is molded and is subjected to the action of a magnetic field so as to magnetize the ferrites and thus obtain a continuous alternation of north and south magnetic poles.

That technique of fabricating an angular coder gasket presents the particular drawback of running the risk of presenting large ferries or ferrite masses which, when they are ill-positioned, lead to faulty magnetic coding. Furthermore, mechanically orienting the ferrites and then performing the operation of molding the matrix does not make it possible to achieve magnetization of maximum amplitude, given the magnetization values of ferrites and the ferrite content in the matrix, since certain particles are not oriented in their easy magnetization direction. Finally, coding density is restricted to 60 pairs of poles for an annular coder gasket having a diameter of about 100 millimeters (mm), in particular for coder gaskets mounted on the crank shafts of motor vehicles. Such a coding value is relatively small given the capabilities of the electronics that process the signals from the coder.

OBJECTS AND SUMMARY OF THE INVENTION

An object of the invention is to improve that technique for fabricating a magnetic coder device both to improve its operation and to improve the coding density that can be achieved.

To this end, the invention provides a method of fabricating a magnetic coder device, the method being of the type consisting in making a mixture of ferromagnetic particles or ferrites in a matrix, in molding the matrix, and in subjecting the molded matrix to a magnetic field so as to obtain a continuous alternation of north and south magnetic poles, which method consists in using a matrix having viscosity that is sufficiently low to enable the ferrites to migrate, in applying a magnetic field during the molding operation while maintaining the matrix at a given temperature in order to reduce its viscosity and thereby making it easier to cause the ferromagnetic particles to migrate and become oriented in their direction of easy magnetization, and to obtain discontinuous shapes having high particle concentration, and in suddenly cooling the matrix while the magnetic field is maintained so as to freeze the particles in the matrix.

By way of example, the matrix is made out of a material whose viscosity, at the appropriate temperatures, may be less than 500 Pascal seconds (Pa·s), which material may be an elastomer or a thermoplastic elastomer, for example.

Thus, by applying the method of the invention, the migration and the orientation of ferromagnetic particles under the action of a magnetic field is controlled both in amplitude and in distribution of field lines in space, in a matrix of viscosity that is sufficiently low to allow the ferromagnetic particles to migrate, thus making it possible to impart geometrical shapes that are discontinuous, with a high concentration of ferromagnetic particles.

Zones are thus obtained that are empty of ferromagnetic particles, thus making it possible to separate poles and to avoid faulty magnetic coding as can be caused by large particles or clusters of particles, and furthermore using a magnetic field to orient the magnetic particles ensues that induction is optimized since the particles become oriented in their direction of easy magnetization.

Advantageously, the matrix is maintained at a temperature that is sufficiently high while the magnetic field is being applied, about 150° C. for a matrix made of thermoplastics material, to obtain a matrix that has viscosity that is sufficiently low.

In general, the matrix is molded in a mold cavity having on either side thereof two concentrators mounted for channeling magnetic field lines, each concentrator presenting etching in the form of projections, with the projections of the two concentrators being placed mutually facing one another.

The invention also provides a device for implementing the method of the invention, the device comprising in particular two coils in axial alignment with each other mounted on respective opposite sides of the mold concentrators in order to produce an electromagnetic field.

The invention also provides a magnetic coder device, in particular an angle coder gasket, suitable for numerous applications in the automobile industry, for example, in particular in anti-locking braking systems (ABS) and for the purpose of monitoring the positions of electromagnetic valves in future internal combustion engines.

BRIEF DESCRIPTION OF THE DRAWINGS

Other advantages, characteristics, and details of the invention appear from the additional description below made with reference to the accompanying drawings that are given purely by way of example, and in which.

MORE DETAILED DESCRIPTION

Figure 1:
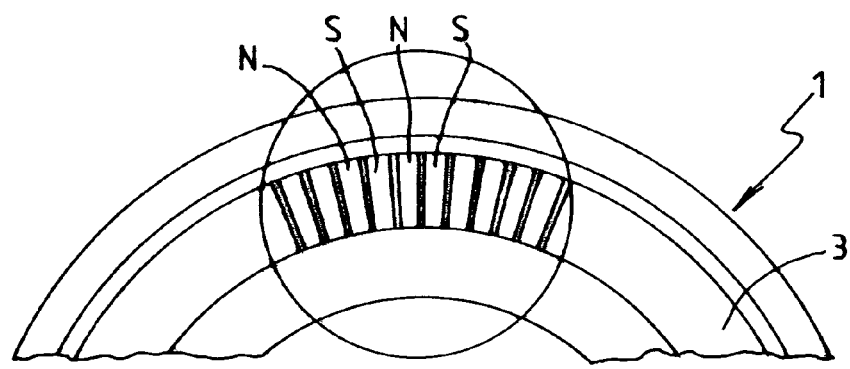
FIG. 1 is a partially cutaway face view of a portion of a prior art angle coder gasket.

FIG. 1 shows a portion of a magnetic coder device such as an angle coder gasket 1 of annular shape which presents alternating north and south poles. These north and south poles are obtained by mixing ferromagnetic particles in an elastomer matrix 3, molding the matrix, and then applying a magnetic field, with such a prior art method presenting the drawbacks mentioned in the introduction.

In contrast, the method of the invention consists in making a mixture of ferromagnetic particles in a matrix of a material that presents viscosity that is sufficiently low, e.g. less than 500 Pa·s, to ensure that the particles can migrate in the matrix and also that they can become oriented along their direction of easy magnetization under the action of a magnetic field that is applied during the operation of molding the matrix. By way of example, the matrix may be made of an elastomer material or a thermoplastic elastomer.

In general, when implementing the method, a matrix is obtained at a temperature that is high enough to reduce its viscosity and facilitate the migration and the orientation of the particles, which temperature may be about 150° C. for a matrix made of thermoplastic elastomer material.

Furthermore, at the end of implementing the method, the matrix is cooled suddenly so as to freeze the particles while the magnetic field continues to be applied.

Implementing this method makes it possible to set up alternating north and south poles, i.e. geometrical shapes having high concentrations of ferromagnetic particles to form poles which are separated in pairs by zones that are empty of ferromagnetic particles.

Figure 2:
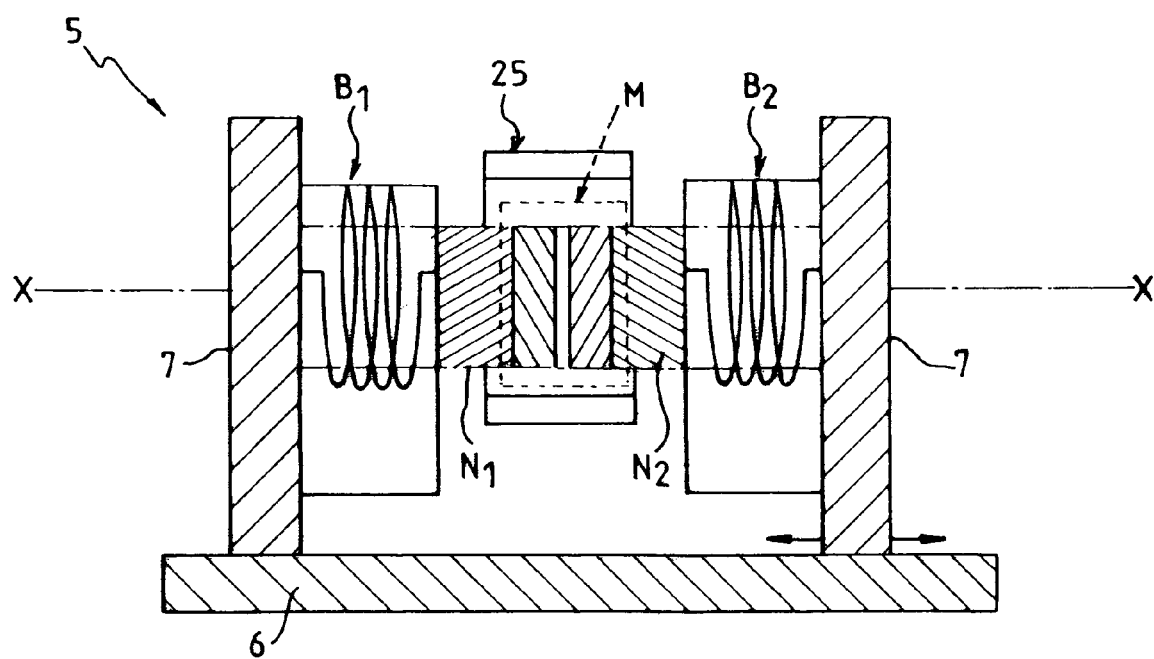
FIG. 2 is a diagrammatic view showing the principle of a device for structuring ferromagnetic particles in order to implement the method of the invention.

In general, the ferromagnetic particles are structured in the elastomer matrix while performing the molding operation using a structuring device 5 as shown diagrammatically in FIG. 2. The device 5 comprises in particular a base 6 from which there extend two vertical posts 7, one of which can move along the base 6 in appropriate guide and fixing means. The facing faces of the two posts 7 support two coils $B_1$ and $B_2$ that are in axial alignment with each other on an axis X-X perpendicular to the posts 7. Inside each coil $B_1$ and $B_2$, there is placed a solid core $N_1$ or $N_2$ of soft iron for example, which projects beyond the facing end faces of the two coils $B_1$ and $B_2$, and a mold M is placed between the two facing end faces of the two cores $N_1$ and $N_2$. The mold M includes in particular two soft iron concentrators 10 for concentrating the electromagnetic field lines produced by the two coils $B_1$ and $B_2$, these two concentrators 10 extending perpendicularly to the axis X-X of the two coils $B_1$ and $B_2$ which will produce an electromagnetic field when they are powered from a power supply (not shown).

Figure 3:
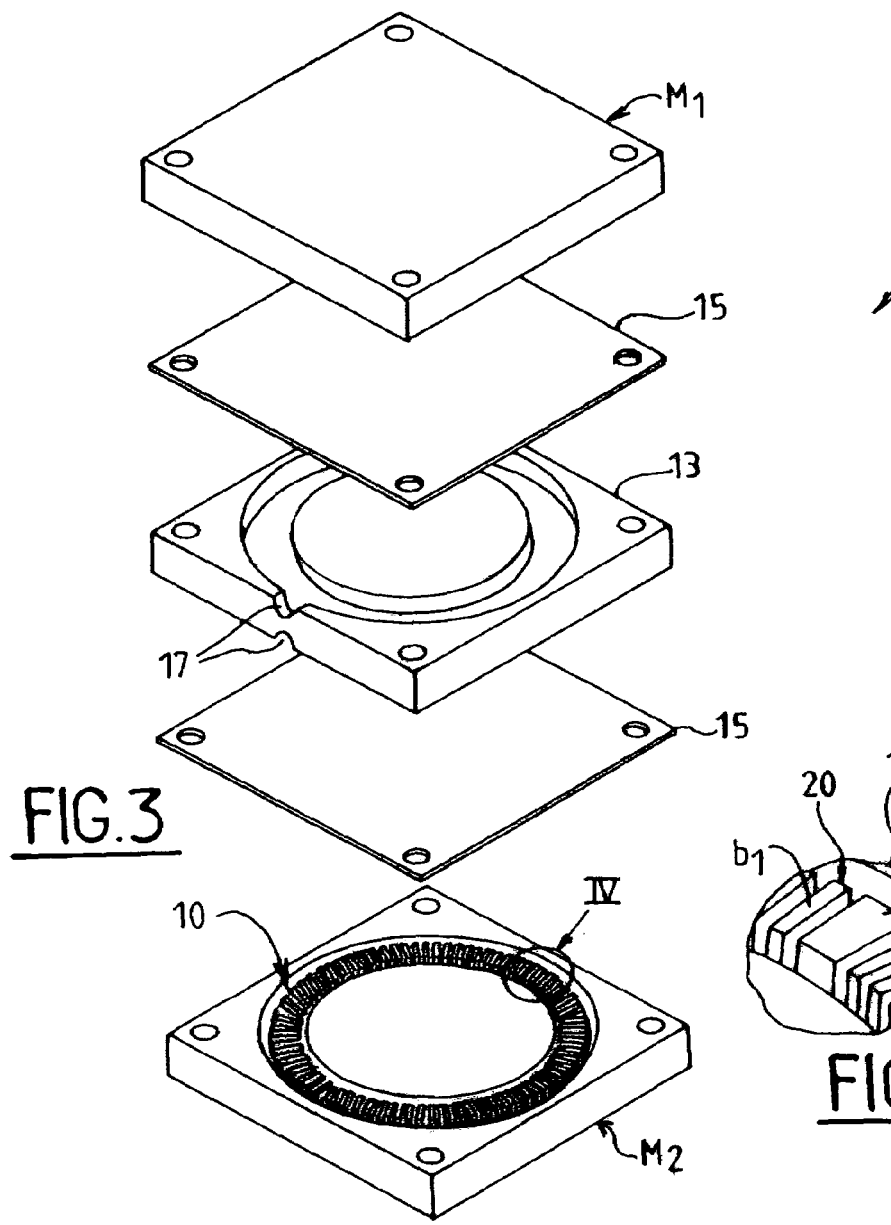
FIG. 3 is an exploded view of a mold for making a magnetic coder device of the invention, and which includes in particular, two magnetic field line concentrators.

An example of a mold M is shown in exploded form in FIG. 3, the mold M including the two soft iron concentrators 10 which are mounted, for example, in two end portions $M_1$ and $M_2$ of the mold M, and between which there is mounted an annular mold shape 13 forming the mold cavity, with a magnetically conductive sheet 15 being interposed between the mold shape 13 and each of the concentrators 10. Each sheet 15 allows the electromagnetic field lines produced by the two coils $B_1$ and $B_2$ to pass, but constitutes a leakproof barrier to prevent the elastomer or thermoplastic elastomer material that is injected into the cavity 13 via openings 17 being able to pollute the concentrators 10.

Figure 4:
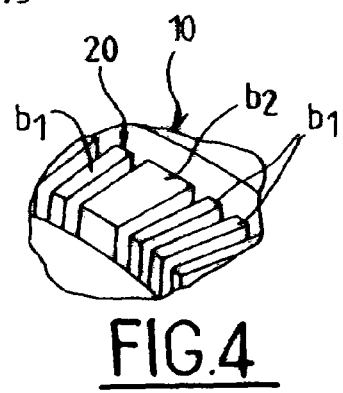
FIG. 4 is a fragmentary perspective view on a larger scale showing a detail IV of FIG. 3 to show the etching that is formed on each of the concentrators.

If it is desired to mold a magnetic coder device in the form of a ring, for example, concentrators 10 are used that are ring-shaped, presenting etching 20 constituting a set of projections $b_1$ and $b_2$, for example, which projections are regularly distributed around a circle and are in the form of rectangular blocks whose long axes converge on the center of the ring (FIG. 4). The projections $b_2$ are larger in size than the projections $b_1$, so as to form magnetic singularities that constitute absolute angle reference points for the processing electronics, with the number of such projections being small compared with the number of projections $b_1$.

Figure 5:
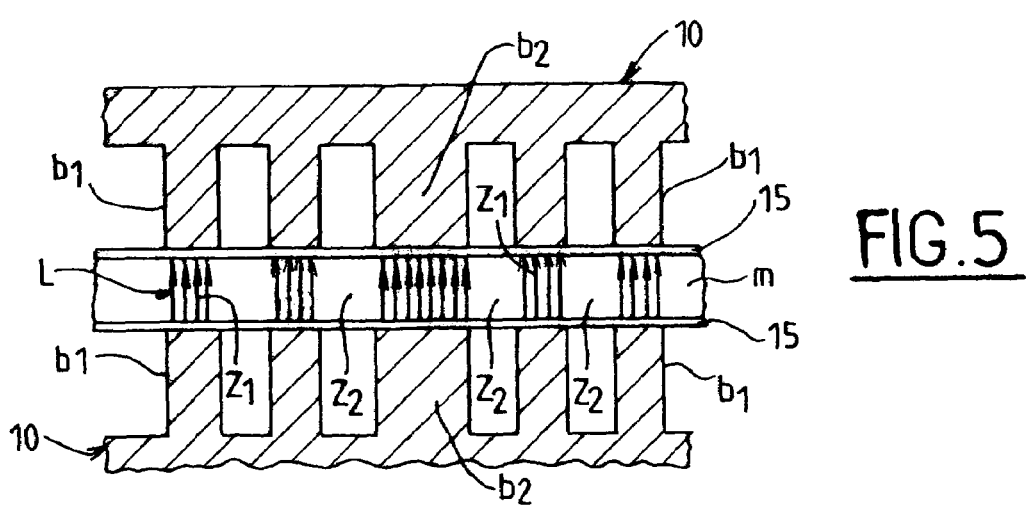
FIG. 5 is a flat half-view partially in section of the FIG. 3 mold in a closed position.

The two concentrators 10 are identical and are mounted in such a manner that their projections $b_1$ and $b_2$ face one another mutually, as shown in FIG. 5, so as to concentrate the magnetic field lines L produced by the two coils $B_1$ and $B_2$ and thus cause the ferromagnetic particles to migrate and orient themselves along their easy magnetization axes. Discontinuous shapes of high particle concentration are thus obtained between the projections $b_1$ of the two concentrators 10.

More precisely, the ferromagnetic particles contained in the matrix 3 migrate and become oriented in their direction of easy magnetization in those zones of the matrix that are situated in register with the projections $b_1$ so as to form a series of zones $Z_1$ of high concentration, which zones are separated by zones $Z_2$ which are empty of particles. In order to obtain this result, the matrix 3 is maintained at a temperature which is sufficiently high to reduce its viscosity and facilitate migration and orientation of the particles, said temperature possibly being about 150° C. for a matrix made of thermoplastic elastomer material, after which the matrix 3 is cooled down suddenly so as to freeze the particles in the configuration of zones $Z_1$ and $Z_2$. The matrix 3 may be cooled, for example, by means 25 situated on either side of the mold M.

By way of example, for an annular coder gasket having a diameter of about 100 mm, it is possible to make several hundred pairs of poles instead of sixty as is the case for a prior art gasket, with this number depending on the material used for the matrix 3.

In general, the device obtained from the mold shape 13 is mounted to rotate and to co-operate with a stationary sensor (not shown) which may be a Hall effect sensor or a magneto-resistive sensor, where a magneto-resistive sensor presents better sensitivity.

A magnetic coder device of the invention may advantageously be used in any application for measuring angular speed, with it being possible to have angular positioning information provided by the presence of one or more magnetic singularities which provide one or more angular reference positions.

Amongst the applications that can be envisaged, particular mention can be made of the automobile industry for measuring the speeds of rotation of wheels in ABS braking systems, or for measuring the speed and the position of crank shafts. Furthermore, the magnetic coder device can be used for developing engines having electromagnetically-driven valves, which require the valves to be positioned accurately and dynamically.

What is claimed is:

1. A method of fabricating a magnetic coder device usable for accurately and dynamically positioning electromagnetically-driven valves of a motor vehicle, comprising:

making a mixture of ferromagnetic particles in a matrix having a viscosity that is sufficiently low to enable the particles to migrate, placing the mixture in a mold having a mold cavity with a mold shape configured for producing a magnetic coder device with alternating geometrical shapes having high concentrations of ferromagnetic particles to form alternating north and south poles which are separated in pairs by zones that are empty of ferromagnetic particles, and wherein this device includes magnetic singularities which constitute absolute angle reference points, so that the device is usable for accurately and dynamically positioning electromagnetically-driven valves of a motor vehicle, positioning on either side of the mold, two soft iron concentrators, each presenting an etching in the form of projections which mutually face one another for channeling magnetic field lines through the alternating geometrical shapes of the magnetic coder device, applying a magnetic field to the mixture in the mold during a molding step in which the mixture is molded in the mold while maintaining the matrix at a given temperature to reduce the viscosity of the matrix thereby making it easier to cause the ferromagnetic particles to migrate and become oriented in their direction of easy magnetization, and cooling the matrix while the magnetic field is maintained so as to freeze the particles in the matrix.

2. A method according to claim 1, in which a matrix is made whose viscosity is less than 500 Pa.s.

3. A method according to claim 1, in which the matrix is made from an elastomer material.

4. A method according to claim 1, in which the matrix is made from a thermoplastic elastomer material.

5. A method according to claim 4, in which the matrix is maintained at a temperature of about 150° C. to obtain a matrix having viscosity that is sufficiently low.

6. A method according to claim 1, wherein the mold shape is annular for producing a magnetic coder device in the shape of a ring.

7. A method according to claim 6, wherein the concentrators are ring-shaped and the projections are regularly distributed around the ring-shaped concentrators.

8. A method according to claim 7, wherein the two concentrators are identical and the step of positioning concentrators on either side of the mold includes mounting the two concentrators such that their projections face one another.

9. A method according to claim 1, wherein the mold includes an opening communicating with the mold cavity and the step of placing the mixture in a mold comprises injecting the mixture into the mold through the opening.

* * * * *